United States Patent [19]
Mammino et al.

[11] Patent Number: 6,103,815
[45] Date of Patent: Aug. 15, 2000

[54] FLUORINATED CARBON FILLED LATEX FLUOROCARBON ELASTOMER

[75] Inventors: Joseph Mammino; Robert M. Ferguson, both of Penfield; George J. Heeks, Rochester; Arnold W. Henry; Santokh S. Badesha, both of Pittsford; Ihor W. Tarnawskyj, Webster; Frederick E. Knier, Jr., Wolcott; Martin A. Abkowitz, Webster; Kock-Yee Law, Penfield, all of N.Y.

[73] Assignee: Xerox Corporation, Stamford, Conn.

[21] Appl. No.: 09/024,269

[22] Filed: Feb. 17, 1998

[51] Int. Cl.$^7$ ................................................ C08L 27/12
[52] U.S. Cl. ............................................ 524/546; 524/551
[58] Field of Search ...................... 524/551, 546

[56] References Cited

U.S. PATENT DOCUMENTS

| | | | |
|---|---|---|---|
| 5,576,805 | 11/1996 | Ishihara et al. | 355/219 |
| 5,761,595 | 6/1998 | Tarnawskyj et al. | 399/308 |
| 5,765,085 | 6/1998 | Law et al. | 399/329 |
| 5,841,462 | 11/1998 | Matsuo et al. | 347/213 |

*Primary Examiner*—David W. Wu
*Assistant Examiner*—Kelechi C Egwim
*Attorney, Agent, or Firm*—John L. Haack

[57] ABSTRACT

A composition comprising a latex fluorocarbon elastomer and fluorinated carbon, xerographic component surfaces comprising such latex fluorocarbon elastomer and fluorinated carbon compositions, and image forming apparatii including such xerographic components are disclosed herein.

12 Claims, 2 Drawing Sheets

FLUORINATED CARBON FILLED LATEX FLUOROCARBON ELASTOMER

BACKGROUND OF THE INVENTION

The present invention relates to compositions useful as xerographic component surfaces, and more specifically to fluorinated carbon filled latex fluorocarbon elastomer compositions as surfaces on a supporting substrate useful in electrostatographic, including digital, apparatii, including the surfaces of fuser system members or fuser members, including donor rolls, belts, films, sheets, and the like; pressure rolls, belts, films, sheets, and the like; fuser rolls, belts, films, sheets and the like; toner transfer system members including toner transfer components such as rollers, belts, films, sheets and the like; and biasable system members including biasable components such as bias transfer or bias charging rolls, belts, films, sheets and the like. The present invention provides environmentally friendly fluorinated carbon filled latex fluorocarbon elastomer surfaces for xerographic system members wherein, in embodiments, the electrical characteristics can be tailored to a desired resistivity range, and wherein the resistivity is virtually unaffected by filler loading, changes in temperature, relative humidity, and other environmental changes. Also, the surfaces, in embodiments, have superior chemical resistance and excellent thermal stability.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member.

U.S. Pat. No. 4,399,553, the disclosure of which is hereby incorporated by reference in its entirety, describes a water-based fluoroelastomer coating composition comprising a fluoroelastomer and an amino silane.

Attorney Docket No. D/96120, U.S. application Ser. No. 08/694,121, U.S. Pat. No. 5,736,250, filed Aug. 8, 1996, discloses crosslinked latex fluorocarbon elastomer and amino silane coatings.

There is also known a water-based fluoroelastomer coating composition comprising an aqueous fluoroelastomer dispersion blended with a polyamine compound (e.g., hexamethylenediamine carbamate, N,N-dicynnamylidene-1,6-hexanediamine) as a vulcanizing agent (cf. DuPont's "Viton," Bulletin, No. 5, April, 1961).

Currently, fluorocarbon elastomer coatings have been applied as a thin layer to surfaces using an organic solvent spray or other liquid organic process.

Normally, the fluorocarbon elastomer is first dissolved in volatile hydrocarbon solvents, such as acetone, methyl ethyl ketone, methyl isobutyl ketone or the like, to facilitate the deposition of the thin films of fluorocarbon elastomer on the substrates to be coated and to enable the solvent to evaporate into the atmosphere within a reasonable period of time.

Drawbacks of using organic solvents or other liquid organic processes to coat surfaces with fluorocarbon elastomers, include the high cost associated with the organic solvent and the attendant needed vapor filters. In addition, as the concern over hydrocarbon air pollution by state and federal governmental agencies and private interest groups increases year after year, and in addition, as environmental and health regulations on air pollution resulting from hydrocarbon solvents tighten over time, a need exists for a method for coating fluorocarbon elastomers on surfaces that does not result in excessive hydrocarbon emission. In addition, there is a need for surfaces for xerographic members, wherein the resistivity is able to be tailored to a desired range, and wherein the desired resistivity is virtually unaffected by changes in filler loading, temperatures, relative humidity and other environmental and processing changes. Further, there is a need for xerographic surfaces having superior chemical resistance and excellent thermal stability.

SUMMARY OF THE INVENTION

The present invention includes, in embodiments: a composition comprising a latex fluorocarbon elastomer and a fluorinated carbon.

The present invention further includes, in embodiments: a xerographic system member comprising a supporting substrate and thereover a layer comprising a latex fluorocarbon elastomer and a fluorinated carbon.

In addition, the present invention provides, in embodiments: an image forming apparatus for forming images on a recording medium comprising a processing station, wherein said processing station comprises a xerographic system member comprising a substrate having thereon a layer comprising a latex fluorocarbon elastomer and a fluorinated carbon.

BRIEF DESCRIPTION OF THE DRAWINGS

For a better understanding of the present invention, reference may be had to the accompanying figure.

DETAILED DESCRIPTION OF THE PRESENT INVENTION

The present invention relates to compositions useful as layers for xerographic components, wherein the layers comprise a latex fluorocarbon elastomer and a fluorinated carbon.

Figure 1:
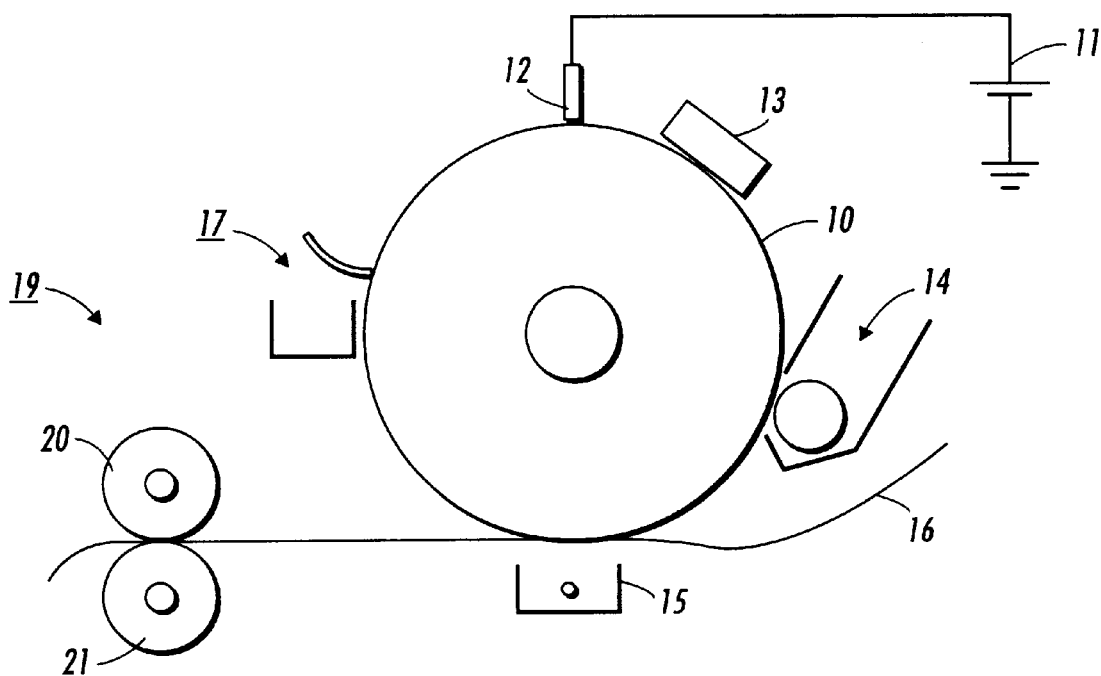
FIG. 1 is a schematic view of an electrostatographic reproducing apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fuser roll 20 and pressure roll 21, wherein the developed image is fused to copy sheet 16 by passing copy sheet 16 between the fusing and pressure members, thereby forming a permanent image. Photoreceptor 10, subsequent to transfer, advances to cleaning station 17, wherein any toner left on photoreceptor 10 is cleaned therefrom.

The conductive latex surfaces are preferably formed over xerographic components such as fuser system members or fuser members, including donor rolls, belts, films, sheets, and the like; pressure rolls, belts, films, sheets, and the like; fuser rolls, belts, films, sheets and the like; and other xerographic system members including toner transfer members such as transfer rollers, belts, films, sheets and the like; and biasable members such as bias transfer rolls, belts, films, sheets and the like. Because of the unique differences in physical and performance characteristics of the many xerographic systems, it would be highly unusual to develop a surface which would provide superior results for the various and diverse xerographic system members. Such a surface would require mechanical, electrical and chemical characteristics to enable good release for fusing and toner transfer, good thermal conductivity for fusing, good electrical resistivity for charging members and transfer members, and controlled conductivity which is virtually unaffected by changes in temperature, relative humidity and changes in filler loading. Surprisingly, the unique characteristics of the fluorinated carbon filled latex fluoropolymer of the present invention provides a surface which possesses superior results when used as a surface layer for various xerographic components.

One of the superior qualities of the fluorinated carbon filled latex fluorocarbon elastomer is that it provides for tailoring and control of desired resistivity, allowing this composition to be suitable for use as an outer surface for the above various xerographic components. In addition, the surfaces provided herein are "green" or environmentally friendly, which is another desirable feature of the layers.

The xerographic system member substrate on which the conductive latex fluorocarbon elastomer is coated may be a fuser member, such as a fuser member, donor member, pressure member, or like member, wherein the substrate member may be in the form of a cylindrical sleeve, drum, belt, film, sheet, or the like. In the case of a roll or cylindrical sleeve, the substrate may take the form of a cylindrical metal core, such as copper, aluminum, steel, titanium, iron, nickel, or like metals, or certain plastic materials chosen to maintain rigidity, structural integrity, as well as being capable of having the latex fluorocarbon elastomer coated thereon and adhered firmly thereto. In another embodiment, the belt, film or sheet substrate comprises a high temperature plastic such as a polyimide. Examples of suitable fuser members include instant-on fusing systems as disclosed in, for example, U.S. Pat. No. 5,087,946 to Dalal et al., which discloses an instant-on fusing system including a fuser roll having a hollow plastic cylinder having a conductive fiber filler and having a relatively thin wall, and a heating element disposed within the fuser roll. The disclosure of this patent is hereby incorporated by reference in its entirety.

The present latex fluorocarbon elastomer surfaces are also suitable for use with toner transfer components such as an intermediate transfer member, bias transfer member, or other toner transfer member, wherein the member substrate may take the form of roll, belt, sheet, film or the like. Examples of intermediate transfer members are found in U.S. Pat. No. 5,110,702, which discloses non-electrostatic transfer of a toner image using a roll as an intermediate transfer member. Examples of intermediate transfer members are also found in U.S. Pat. No. 3,893,761, which discloses an intermediate transfer belt having a polyimide film substrate coated with a silicone rubber or a fluoroelastomer. The disclosure of this patent is hereby incorporated by reference in its entirety.

Further, the latex fluorocarbon surfaces may be suitable for use in bias charging members including bias charging rolls, belts, films, sheets or the like. Examples of bias charging members are set forth in the art such as U.S. Pat. No. 5,112,708 to Okunuki et al., which discloses a charging member comprising a S surface layer formed of N-alkoxymethylated nylon which may be filled with fluorinated carbon.

Figure 2:
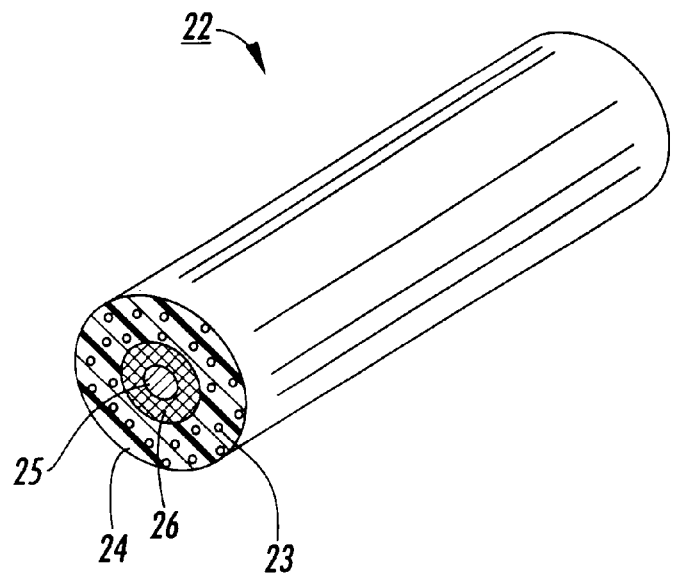
FIG. 2 represents a sectional view of a cylindrical xerographic component having an outer surface layer of an embodiment of the present invention.

FIG. 2 demonstrates an embodiment of the invention wherein a xerographic component in the form of a cylindrical roll 22 has a fluorinated carbon 23 filled latex fluorocarbon elastomer outer surface 24 provided on a cylindrical core 25.

Figure 3:
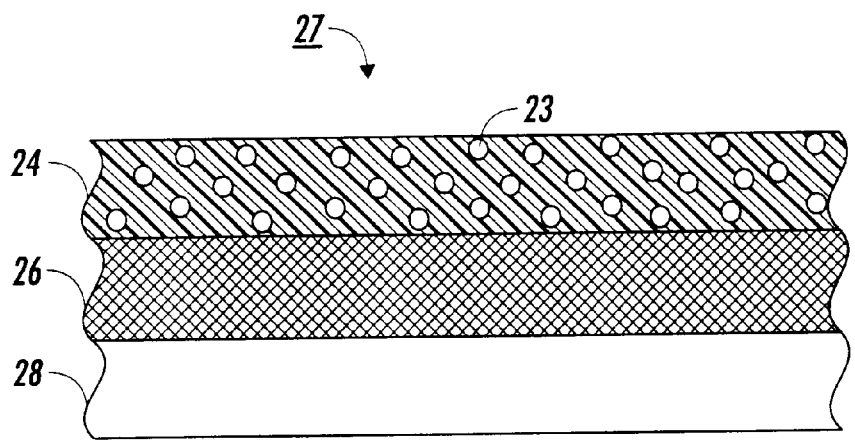
FIG. 3 represents a sectional view of a belt-type xerographic component having an outer surface layer of an embodiment of the present invention.

FIG. 3 demonstrates another embodiment of the invention wherein a xerographic component in the form of a belt, film or sheet member 27 has a fluorinated carbon 23 filled latex fluorocarbon elastomer outer surface 24 provided on a belt substrate 28.

In an embodiment of the invention, not shown in the figures, the xerographic component may be in the form of a sheet or film. For example, a non-endless film may be rolled on a supply shaft and taken out to be wrapped on a take-up shaft. Reference is made to U.S. Pat. No. 5,157,446, the disclosure of which is hereby incorporated by reference in its entirety.

In the process for forming the xerographic member surface, the latex fluorocarbon elastomer is preferably added last. In an embodiment, initially, two dispersions can be formed and subsequently, the latex fluorocarbon elastomer added therein. Alternatively, in another embodiment, a single dispersion is formed and subsequently, the latex emulsion is added therein. The details of the process for producing a latex fluoroelastomer are contained in Attorney Docket No. 96120, U.S. application Ser. No. 08/694,121, filed Aug. 8, 1996, the disclosure of which is hereby incorporated by reference in its entirety.

A latex fluorocarbon elastomer is used in the present invention. Latex as used herein refers to a water-based stabilized dispersion of an elastomeric compound. Latex also refers to an essentially aqueous medium (i.e., including only relatively small amounts, for example up to about 10 percent, of solvent). Such a small amount of solvent may be needed to act as a coalescing agent for the elastomer particles to flow together and form a uniform continuous layer. Examples of suitable latex fluorocarbon elastomers include fluorocarbon elastomers such as copolymers of vinylidene fluoride and hexafluoropropylene; terpolymers of vinylidene fluoride, hexafluoropropylene and tetrafluoroethylene; and tetrapolymers of vinylidene fluoride, hexafluoropropylene and tetrafluoroethylene and a cure site monomer. Examples of suitable cure site monomers include 4-bromoperfluorobutene-1; 1,1-dihydro-4-bromoperfluorobutene-1; 3-bromoperfluoropropene-1; 1,1-dihydro-3-bromoperfluoropropene-1; or any other suitable, known cure site monomer commercially available from DuPont or other supplier. Other suitable fluoroelastomers include polymers of perfluoroalkoxy monomers, fluorinated propylene monomers, tetrafluoroethylene monomers, and mixtures thereof. It is preferred that the latex fluoroelastomers have a fluorine content of from about 50 to about 80, and preferably from about 68 to about 70 percent by weight based on the weight of total fluoroelastomer. Specific latex fluoroelastomers are manufactured and are commercially available from Ausimont of Morristown, N.J. A particularly preferred latex fluoroelastomer is TECNOFLON® TN (having 70% solids by weight), available from Ausimont of Morristown, N.J. Other preferred latex fluoroelastomers include FLUOROLAST® WB available from Lauren International, Inc. of New Philadelphia, Ohio as a one-component, curable, pre-catalyzed composition at about 65 weight percent solids.

The solids content of the final latex fluoroelastomer of a coating for a xerographic component is from about 10 to about 70 weight percent, preferably from about 50 to about 60 weight percent. The fluorocarbon elastomer is present in an amount of from about 60 to about 99 percent by weight based on the weight of total solids in the latex. Such fluoroelastomer content can be readily obtained by concentration or dilution. When desired, the latex fluoroelastomer may contain any conventional additive such as a pigment, an acid acceptor or a filler in addition to the fluoroelastomer.

The latex fluoroelastomer of the present invention may be crosslinked with an amino siloxane and either a bi- or multi-functional amino silane. Bifunctional as used herein refers to an amino siloxane with two amino groups and multifunctional as used herein refers to an amino siloxane with more than one amino group. Multifunctional as used herein encompasses both bifunctional and multifunctional. The details a fluoroelastomer crosslinked with an amino silane as a latex fluoroelastomer material are set forth in Attorney Docket No. D/96120, U.S. application Ser. No. 08/694,121, the subject matter of which has been discussed and incorporated by reference above.

An acid acceptor or dehydrofluorinating agent can be added to an emulsifier or surfactant and water in the method for preparing the surfaces of the present invention. As the acid acceptor, it is preferred to use metal oxides and hydroxides, for example, those with a relatively low pH of from about 5 to about 8. Examples of suitable metal oxides and hydroxides include magnesium oxide, calcium hydroxide and zinc oxide. The particularly preferred metal oxide is zinc oxide. Another class of suitable acid acceptors is amines. Examples of suitable amines include diamines, aliphatic and aromatic amines, where the aromatic groups may be benzene, toluene, naphthalene, anthracene, and the like. Specific examples of amines or their Schiff base derivatives include N,N'-dicinnamylidene-1.6 hexanediamine (from about 2.5 to about 5 parts per hundred polymer) available under the tradename TECNOFLON TECNOCIN-A®; hexamethylenediamine carbamate (from about 1 to about 3 parts per hundred polymer) available under the tradename TECNOFLON TECNOCIN-B®; and triethylene tetramine or TETA (from about 1 to about 3 parts per hundred). The metal oxide acid acceptor is added in an amount of from about 2 to about 20 parts per hundred fluorocarbon elastomer, and preferred is from about 8 to about 15 parts per hundred fluorocarbon elastomer. The amine as the acid acceptor can be added in an amount of from about 0.5 to about 5 parts per hundred fluorocarbon elastomer, and preferably from about 1 to about 3 parts per hundred fluorocarbon elastomer. The diaminosiloxane can be added in an amount of about 10 to about 20 parts per hundred fluoroelastomer.

An emulsifier or surfactant may be added in order to form the initial dispersion. In addition, the emulsifier functions to provide increased dispersion of the fillers, acid acceptor and curing and crosslinking agents. Examples of suitable emulsifies include sodiumlaurylsulphate, potassium laurylsulphate, ammonium laurylsulphate, TRITON® X-100 (octylphenoxypolyethoxy-ethanol-polyethylene glycol) manufactured by Union Carbide Chemicals & Plastics Company, Inc., of Danbury, Conn., or TRITON X-405 (available from Rohm & Haas). The emulsifier is added in various effective amounts, for example, an amount of from about 1 to about 10 parts per hundred fluorocarbon polymer with the preferred range being from about 1 to about 3 parts per hundred fluorocarbon elastomer.

Other components may be added to the composition to improve or modify properties of the final coating including colorant pigments, fiberous materials to increase strength and slip agents such as tetrafluoroethylene (TFE) or polytetrafluoroethylene (PTFE), fluorinated ethylenepropylene resin (FEP) and perfluoroalkoxy (PFA) particles to reduce surface energy to improve toner release.

Although any type of water may be used (for example, tap water), purified water such as single, double, and triple distilled water, and deionized water are preferred. It is preferred that ambient deionized water of at least one meg ohm purity be used. The amount of water added is preferably equal to the total amount by weight of the acid acceptor and emulsifier. Preferably, water is added in an amount of from about 2 to about 20 parts per hundred elastomer.

The particular resistivity of the fluorocarbon elastomer composition can be chosen and controlled depending, for example, on the amount of fluorinated carbon, the nature of the curative, the amount of curative, the amount of fluorine in the fluorinated carbon, and the curing procedures including the specific curing agent such as for example MgO, CaO, and $Ca(OH)_2$, curing time, and curing temperature. The resistivity can be generated not only by selecting the appropriate curing agents, curing time and curing temperature as set forth above, but also by selecting a specific polymer and filler, such as a specific fluorinated carbon, or mixtures of various types of fluorinated carbon. The percentage of fluorine in the fluorinated carbon will also affect the resistivity of the fluorocarbon elastomer when mixed therewith. In a preferred embodiment, the resistivity of the fluorinated carbon filled latex fluoroelastomer is from about $10^3$ to about $10^{16}$ ohms/sq, and preferably from about $10^6$ to about $10^{14}$ ohms/sq.

Fluorinated carbon, sometimes referred to as graphite fluoride or carbon fluoride, is a solid material resulting from the fluorination of carbon with elemental fluorine. The number of fluorine atoms per carbon atom may vary depending on the fluorination conditions. The variable fluorine atom to carbon atom stoichiometry of fluorinated carbon permits systemic, uniform variation of its electrical resistivity properties.

Fluorinated carbon refers to a specific class of compositions which is prepared by reacting fluorine to one or more of the many forms of solid carbon. In addition, the amount of fluorine can be varied in order to produce a specific, desired resistivity. Fluorocarbons are either aliphatic or aromatic organic compounds wherein one or more fluorine atoms have been attached to one or more carbon atoms to form well defined compounds with a single sharp melting point or boiling point. Fluorocarbon elastomers are linked-up single identical molecules which comprise long chains bound together by covalent bonds. Moreover, fluoroelastomers are a specific type of fluorocarbon polymer. Thus, despite some apparent confusion in the art, it is apparent that fluorinated carbon is neither a fluorocarbon nor a fluorocarbon elastomer and the term is used in this context herein.

The fluorinated carbon may include the fluorinated carbon materials as described herein. The methods for preparation of fluorinated carbon are well known and documented in the literature, such as in the following U.S. Pat. Nos. 2,786,874; 3,925,492; 3,925,263; 3,872,032 and 4,247,608, the disclosures each of which are totally incorporated by reference herein. Essentially, fluorinated carbon is produced by heating a carbon source such as amorphous carbon, coke, charcoal, carbon black or graphite with elemental fluorine at elevated temperatures, such as from about 150° to about 600° C. A diluent such as nitrogen is preferably admixed with the fluorine. The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke. One form of fluorinated carbon which is suitable for use in accordance with the invention is polycarbon monofluoride which is usually written in the shorthand manner $CF_x$ with x representing the number of fluorine atoms and generally being up to about 1.5, preferably from about 0.01 to about 1.5, and particularly preferred from about 0.04 to about 1.4. The formula $CF_x$ has a lamellar structure composed of layers of fused six carbon rings with fluorine atoms attached to the carbons and lying above and below the plane of the carbon atoms. Preparation of $CF_x$ type fluorinated carbon is described, for example, in above-mentioned U.S. Pat. Nos. 2,786,874 and 3,925,492, the disclosures each of which are incorporated by reference herein in their entirety. Generally, formation of this type of fluorinated carbon involves reacting elemental carbon with $F_2$ catalytically. This type of fluorinated carbon can be obtained commercially from many vendors, including Allied Signal, Morristown, N.J.; Central Glass International, Inc., White Plains, N.Y.; Diakin Industries, Inc., New York, N.Y.; and Advance Research Chemicals, Inc., Catoosa, Okla.

Another form of fluorinated carbon which is suitable for use in accordance with the invention is that which has been postulated by Nobuatsu Watanabe as poly(dicarbon monofluoride) which is usually written in the shorthand manner $(C_2F)_n$. The preparation of $(C_2F)_n$ type fluorinated carbon is described, for example, in above-mentioned U.S. Pat. No. 4,247,608, the disclosure of which is herein incorporated by reference in its entirety, and also in Watanabe et al., "Preparation of Poly(dicarbon monofluoride) from Petroleum Coke", Bull. Chem. Soc. Japan, 55, 3197–3199 (1982), the disclosure of which is also incorporated herein by reference in its entirety.

In addition, preferred fluorinated carbons selected include those described in U.S. Pat. No. 4,524,119 to Luly et al., the subject matter of which is hereby incorporated by reference in its entirety, and those having the tradename ACCUFLUOR®, (ACCUFLUOR® is a registered trademark of Allied Signal, Morristown, N.J.) for example, ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent fluorine content, respectively, based on the weight of total fluorinated carbon. ACCUFLUOR® 1000 and ACCUFLUOR® 2065 have 62 and 65 percent fluorine content, respectively, based on the weight of total fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

The following chart illustrates some properties of four fluorinated carbons of the present invention.

| PROPERTIES | ACCUFLUOR® | | | | UNITS |
|---|---|---|---|---|---|
| GRADE | 1000 | 2065 | 2028 | 2010 | N/A |
| Feedstock | Coke | Conductive Carbon Black | | | N/A |
| Fluorine Content | 62 | 65 | 28 | 11 | % |
| True Density | 2.7 | 2.5 | 2.1 | 1.9 | g/cc |
| Bulk Density | 0.6 | 0.1 | 0.1 | 0.09 | g/cc |
| Decomposition Temperature | 630 | 500 | 450 | 380 | ° C. |
| Median Particle Size | 8 | ~1 | ~1 | ~1 | micrometers |
| Surface Area | 130 | 340 | 130 | 170 | m²/g |
| Thermal Conductivity | $10^{-3}$ | $10^{-3}$ | $10^{-3}$ | N.A. | cal/cm-sec-° C. |
| Electrical Resistivity | $10^{11}$ | $10^{11}$ | $10^8$ | ~10 | ohm-cm |
| Color | Gray | White | Black | Black | N/A |

As has been described herein, a major advantage of the invention is the capability to vary the fluorine content of the fluorinated carbon to permit systematic uniform variation of the resistivity properties of the composition or layer. The preferred fluorine content will depend on, inter alia, the equipment used, equipment settings, desired resistivity, and the specific fluoroelastomer chosen. The fluorine content in the fluorinated carbon is from about 1 to about 70 weight percent based on the weight of fluorinated carbon (carbon content of from about 99 to about 30 weight percent), preferably from about 5 to about 65 (carbon content of from about 95 to about 35 weight percent), and particularly preferred from about 10 to about 30 weight percent (carbon content of from about 90 to about 70 weight percent).

The median particle size of the fluorinated carbon can be less than 1 micron and up to 10 microns, is preferably less than 1 micron, preferably from about 0.001 to about 1 microns, and particularly preferred from about 0.5 to 0.9 micron. The surface area is preferably from about 100 to about 400 m²/g, preferred of from about 110 to about 340, and particularly preferred from about 130 to about 170 m²/g. The density of the fluorinated carbons is preferably from about 1.5 to about 3 g/cc, preferably from about 1.9 to about 2.7 g/cc.

The amount of fluorinated carbon in the layer is from about 1 to about 50 percent by weight of the total solids content, preferably from about 1 to about 40 weight percent, and particularly preferred from about 1 to about 30 weight percent based on the weight of total solids. Total solids as used herein refers to the amount of fluoroelastomer and/or other elastomers, fluorinated carbon fillers, other additives and fillers, and any other solid material remaining in the dried coating after all the water or any other volatile material has evaporated.

It is preferable to mix different types of fluorinated carbon to tune the mechanical and electrical properties. It is desirable to use mixtures of different kinds of fluorinated carbon to achieve good resistivity while reducing the hardness of the coating. Also, mixtures of different kinds of fluorinated carbon can provide an unexpected wide formulation latitude and controlled and predictable resistivity. For example, an amount of from about 0 to about 40 percent, preferably from about 1 to about 40, and particularly preferred of from about 5 to about 35, and even more particularly preferred of from about 25 to about 8 percent by weight of ACCUFLUOR® 2010 can be mixed with an amount of from about 0 to about 40 percent, preferably from about 1 to about 40, and particularly preferred from about 5 to about 35 percent ACCUFLUOR® 2028, and even more particularly preferred from about 8 to about 25 percent ACCUFLUOR® 2028. Other forms of fluorinated carbon can also be mixed. Another example is an amount of from about 0 to about 40 percent ACCUFLUOR® 1000, and preferably from about 1 to about 40 percent, and particularly preferred from about 5 to about 35 percent, mixed with an amount of from about 0 to about 40 percent, preferably from about 1 to about 40, and particularly preferred from about 1 to about 35 percent ACCUFLUOR® 2065. All other combinations of mixing the different forms of ACCUFLUOR® are possible. A preferred mixture is from about 0 to about 15 percent ACCUFLUOR® 2028 mixed with from about 2 to about 3.5 percent ACCUFLUOR® 2010. Another preferred mixture is from about 0.5 to about 10 percent ACCUFLUOR® 2028 mixed with from about 2.0 to about 3.0 percent ACCUFLUOR® 2010. A particularly preferred mixture is from about 1 to about 3 percent ACCUFLUOR® 2028 mixed with from about 2.5 to about 3 percent ACCUFLUOR® 2010, and even more preferred is a mixture of about 3 percent ACCUFLUOR® 2010 and about 2 percent ACCUFLUOR® 2028. All the above percentages are by weight of the total solids.

Other adjuvants and fillers may be incorporated in the latex fluorocarbon elastomer in accordance with the present invention as long as they do not affect the integrity of the cured latex fluorocarbon elastomer. Such fillers normally encountered in the compounding of fluorocarbon elastomer include coloring agents, reinforcing fillers, alumina or other additives to increase thermal conductivity and processing aids. Oxides such as copper oxides may be added in certain amounts to the coatings to provide sufficient anchoring sites for functional release oils, and thereby allow excellent toner release characteristics for layers used as fuser members. However, the present invention provides an outer layer, wherein the outer layer has exceptional release properties due to the lower surface energy of the fluorinated carbon compared to typical coatings using non-fluorinated carbon. Therefore, little or no functional (having no chemical reactivity) fuser oil may be necessary. Optional reinforcing fillers may be added prior to addition of the latex fluorocarbon elastomer. Specific examples of preferred fillers include fillers having a pH of from about 5 to about 8. Examples of suitable fillers such as pigments include, for example, zinc oxide, iron II and iron III oxide, titanium dioxide and chromium oxides. Other suitable fillers include the clays and silicates such as calcium metasilicate or Neuburg clay. The fillers can be added in an amount of from about 1 to about 40 parts per hundred fluorocarbon elastomer with preferred being from about 25 to about 30 parts per hundred hydrocarbon elastomer.

The fluorinated carbon filled latex fluorocarbon elastomer may be applied to a substrate by spraying, dipping, slot coating, web coating, flow coating, silk screening, or the like. The coating is first air dried and then heat cured. The air drying time is from about 30 minutes to about 48 hours, and preferred is from about 1 to about 24 hours. The temperature for air drying is from about 20 to about 60° C., preferably from about 40 to about 50° C. The fluorinated carbon filled latex fluorocarbon elastomer is subsequently heat cured. The heat curing time is from about 30 minutes to about 24 hours, preferably from about 1 to about 6 hours, and particularly preferred from about 1 to about 2 hours. The temperature of the heat cure is from about 25 to about 150° C., preferably from about 50 to about 100° C. and particularly preferred from about 60 to about 90° C. The post curing can be at a temperature of from about 100 to 250° C. and at a time of from about 15 minutes to about 24 hours. The preferred post curing is for about 1 hour at about 250° C.

A fluorinated carbon filled latex fluorocarbon elastomer outer surface layer is preferably from about 10 to about 1,250, more preferably 20 to about 1,000 micrometers thick.

The surface resistivity of the outer layer for a transfer or a fuser member is preferably from about $10^3$ to about $10^{16}$, preferably from about $10^6$ to about $10^{14}$, and more preferably from about $10^8$ to about $10^{12}$ ohms/sq. The desired volume resistivity for this configuration is from about $10^4$ to about $10^{12}$, preferably from about $10^6$ to about $10^{11}$ ohm-cm. The desired resistivity can be provided by varying the concentration of the conductive filler. The fuser member is susceptible to paper stripping problems due to triboelectric charge build-up if the resistivity is not within the desired range.

The surface resistivity of the outer layer for a bias member is preferably from about $10^4$ to about $10^{12}$, and preferably from about $10^6$ to about $10^{11}$ ohms/sq. The volume resistivity is preferably from about $10^4$ to about $10^{10}$ ohms-cm. Again the desired resistivity can be achieved by varying the concentration of the conductive filler. The transfer member will exhibit undesirable effects if the resistivity is not within the desired range, including nonconformance at the contact nip and poor toner releasing properties. The transfer member preferably possess the desired resistivity enabling a field to be created to transfer dry toner or liquid ink from one substrate to another. Bias members are known to generate contaminates during charging that may cause copy contamination or photoreceptor contamination if the desired resistivity is not within range.

In an embodiment wherein the fluorinated carbon filled latex fluoroelastomer layer is an outer surface layer, optionally, there may be one or more, and possibly up to 10 intermediate layers between the substrate and the outer layer of the latex fluoroelastomer if desired. An adhesive layer 26 is depicted in FIGS. 2 and 3. Optional intermediate adhesive layers and/or elastomer layers may be applied to achieve desired properties and performance objectives of the present invention. An adhesive layer may be selected from a polymeric compound, for example, epoxy resins, silanes and polysiloxanes. Preferred adhesives are proprietary materials such as THIXON 4031404, Union Carbide A-i 100, Dow TACTIX 740, Dow TACTIX 741, and Dow TACTIX 742. A particularly preferred curative for the aforementioned adhesive is DOW TACMX 741 and 742, available from Dow Chemical Company. Typical elastomer layers include materials having the appropriate thermal and mechanical properties for such layers such as silicone elastomers and fluoroelastomers. Preferred elastomer layers comprise a fluoroelastomer, a polyurethane elastomer, an acrylic elastomer or a silicone elastomer. The thickness of the intermediate layer is from less than about 1 to about 1,250 microns, preferably from about 0.5 to about 1,000 microns. The intermediate elastomer layer may also be an environmentally friendly surface employing no solvents and deposited as 100 percent solid coating that may be polymerized by curing or crosslinking to a solid layer or from an aqueous latex composition.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Latex Emulsion/Dispersions Coated on Stainless Steel and Polyimide Substrates A general but not exclusive approach for preparation of a latex emulsion is to prepare two or more ingredient dispersions and add them to the latex emulsion. For example, an acid acceptor and an emulsifier were mixed into an approximately equal weight of deionized water to form the first dispersion. Fillers and curatives were mixed in the same manner to form to make a second dispersion. These two dispersions were then slowly stirred into the latex containing fluoroelastomer, which may or may not contain an antifoaming agent, and in this case an antifoaming agent was added. This final dispersion was then ready for coating.

More specifically, an embodiment of the present invention was prepared as follows. An amount of 100 mg of TN LATEX TECNOFLON® at about 70 weight percent solids from Ausimont was added to various amounts of fluorinated carbon (ACCUFLUOR® 2028 from Allied Signal, New Jersey). Table 1 below lists the various amounts of fluorinated carbon added to the latex fluoroelastomer. The mixtures were put into a glass jar containing stainless steel shots (1,200 grams), and were roll milled using a paint shaker for approximately 18 hours. A curative, TECNOCIN B® (hexamethylenediamine carbamate) in an amount of about 0.5 weight percent based on the weight of polymer solids dissolved in about 10 mg of water was added after the roll milling was complete. Coating 4 also contained about 5 weight percent of a coalescent agent such as diethylene glycol n-butyl ether and about 0.25 weight percent TRITON X-405® (available from Rohm & Haas), each based on the weight of total polymer solids. The final dispersions were coated to various thicknesses, oven dried for 1 hour and 45 minutes at 130° F. (54° C.), and cured/post cured for 18 hours at 194° F. (90° C.). The various dispersions were coated onto various substrates as set forth in Table 1 below.

TABLE 1

| Coating | ACCUFLUOR® 2028 (percent by weight) | Curative | Substrate | Coating Thickness (inches) |
| --- | --- | --- | --- | --- |
| 1 | 2.9 | TECNOCIN® B | Stainless Steel | 0.012 |

TABLE 1-continued

| Coating | ACCUFLUOR® 2028 (percent by weight) | Curative | Substrate | Coating Thickness (inches) |
| --- | --- | --- | --- | --- |
| 2 | 5.6 | TECNOCIN® B | Stainless Steel | 0.010 |
| 3 | 8.3 | TECNOCIN® B | Stainless Steel | 0.008 |
| 4 | 8.3 | TECNOCIN® B, diethylene glycol n-butyl ether and TRITON® X-405 | Stainless Steel | 0.008 |
| 5 | 2.9 | TECNOCIN® B | KAPTON® | 0.013 |
| 6 | 8.3 | none | KAPTON® | 0.003 |

Example 2

Resistivity Testing

Lateral resistivity measurements were conducted on coating 5, using a conformable contact, 2 point, guarded electrode probe, Trek 610C power supply, and Keithley 610B electrometer. Measurements were taken at electric fields from about 6 to about 6000 V/cm and the results showed no observable field dependence on conductivity in that region. That data is shown in Table 2 below.

TABLE 2

| E(V/cm) | Resistivity ohms/sq |
| --- | --- |
| 6 | $3.5 \times 10^{11}$ |
| 60 | $1.7 \times 10^{11}$ |
| 300 | $1.8 \times 10^{11}$ |
| 600 | $1.6 \times 10^{11}$ |
| 1,200 | $1.6 \times 10^{11}$ |
| 1,800 | $1.6 \times 10^{11}$ |
| 3,000 | $1.6 \times 10^{11}$ |
| 4,500 | $1.5 \times 10^{11}$ |
| 6,000 | $1.5 \times 10^{11}$ |

The data above show that the latex based fluoroelastomer/fluorinated carbon dispersions exhibit similar bulk electrical behavior analogous to films prepared using solvent based VITON® GF as the fluorocarbon elastomer, with the added benefit that the latex polymer dispersions are environmentally friendly as they contain water as a base in place of harmful organic solvents. Specifically, while the field varied from about 6 V/cm to about 6,000 V/cm, the surface resistivity of the fluorinated carbon filled latex fluoroelastomer layers remained relatively the same and in the range of from about $3.5 \times 10^{11}$ to about $1.5 \times 10^{11}$ ohms/sq.

Example 3

Conductivity Testing

Bulk resistivity (conductivity) measurements were made on specimens configured as plane parallel capacitors using evaporated gold electrodes on opposing surfaces. Measurements were carried out using a Keithley 617 electrometer in conjunction with a variety of DC power supplies with the entire apparatus under computer control. The applied fields typically ranged from about 10 V/cm to about 4,500 V/cm. Typical data is displayed in Table 3 for a specimen similar to coating 4 in Example 1 above comprising 8.3 weight percent ACCUFLUOR® 2028 in TECHNOFLON® TN latex. In the field range of about 20 to about 50,000 V/cm resistivity decreased by only about a factor of 3.

TABLE 3

| E (V/cm) | ohms/cm |
| --- | --- |
| 20 | $3 \times 10^{11}$ |
| 21 | $4.0 \times 10^{11}$ |
| 22 | $4.2 \times 10^{11}$ |
| 23 | $4.5 \times 10^{11}$ |
| 24 | $5. \times 10^{11}$ |
| 25 | $5.3 \times 10^{11}$ |
| 26 | $5.5 \times 10^{11}$ |
| 27 | $5.8 \times 10^{11}$ |
| 28 | $5.8 \times 10^{11}$ |
| 10,000 | $6 \times 10^{11}$ |
| 20,000 | $6.8 \times 10^{11}$ |
| 50,000 | $10 \times 10^{11}$ |

Example 4
Preparation of Latex Emulsion/Dispersion Coated on Polyimide Substrate About 2.0 grams of ACCUFLUOR® 2010 was added to about 50 grams of an aqueous particle dispersion of a perfluorinated thermoplastic copolymer of tetrafluoroethylene (TFE) and an appropriate vinylether (PFVE) available from Ausimont under the designation HYFLON® MFA at about 55 weight percent solids. The mixture was put into a glass jar containing glass beads and roll milled for about 2 hours. The mixture was filtered to separate the glass beads and the resulting dispersion was hand mixed by stirring into about 50 grams of a water-borne fluoroelastomer composition available from Lauren International, Inc., New Philadelphia, Ohio under the tradename FLUOROLAST® WB. FLUOROLAST® WB is a one component, curable, precatalyzed composition with similar fluoroelastomers as those in TECHNOFLON® TN. The dispersion was coated on conductive polyimide film, air dried for about 3 hours, and subsequently cured in an oven at about 225° F. for about 2 hours and then heated to about 500° F. for about 15 minutes. The post cure relatively high temperature treatment allowed some of the TFE/PFVE copolymer particles to bloom to the surface. The dry coating thickness was about 40 microns. The surface resistivity of the coating was about $10^9$ ohms/sq. The low surface energy together with low coefficient of friction of the coating against paper, i.e. about 0.28, indicated low wear rate and good toner release properties useful for a transfer member in a xerographic system.

Example 5
Preparation of Latex Emulsion/Dispersions as Coatings for Fuser Member A composition similar to coating 1 prepared as outlined in Example 1 was prepared using 3 weight percent ACCUFLUOR® 2028 and FLUOROLAST® WB as the fluoroelastomer. The composition was spin cast to produce belts about 5 inch in diameter and cut into single layer sheets. The belts and sheets were formed to dry coating thicknesses of from about 10 mils to about 60 mils. The self-supporting sheets were tested using both liquid and dry toner, and were found to produce prints that compared very favorably to control prints produced with a standard fuser member coated with a fluoroelastomer surface coating applied using an organic solvent system.

Example 6
Preparation of Latex Emulsion/Dispersions as Coatings for Bias Transfer Member The coating 5 (Table 1 of Example 1) can be prepared as outlined in Example 1 and applied as a surface layer over a polyurethane elastomer based bias transfer member. The roller is estimated to be about 50 mm in diameter. The polyurethane can contain an ionic conductor to achieve a resistivity of about $10^{11}$ ohms/sq. The latex fluoroelastomer/fluorinated carbon dispersion coating is estimated to effectively seal in the ionic conductor in the polyurethane preventing any leaching, leaking, migration and contamination of the ionic conductor to through-put paper and to any other near-by components in the machine.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A composition comprising an aqueous latex comprised of a fluorocarbon elastomer in an amount of from about 60 to about 99 percent by weight of the total solids, a fluorinated carbon in an amount of from about 1 to about 50 percent by weight of the total solids, in an emulsifier an amount of from about 1 to about 10 percent by weight of the elastomer, and water in an amount of from about 2 to about 20 percent by weight of the elastomer.

2. A composition as claimed in claim 1, wherein said latex fluorocarbon elastomer is a latex fluorocarbon elastomer selected from the group consisting of a) copolymers of vinylidenefluoride and hexafluoropropylene, b) terpolymers of vinylidenefluoride, hexafluoropropylene and tetrafluoroethylene, and c) tetrapolymers of vinylidenefluoride, hexafluoropropylene, tetrafluoroethylene and a cure site monomer.

3. A composition as claimed in claim 2, wherein said latex fluorocarbon elastomer is selected from the group consisting of terpolymers of vinylidene fluoride, hexafluoropropylene and tetrafluoroethylene.

4. A composition as claimed in claim 1, wherein said latex fluorocarbon elastomer comprises a monomer unit selected from the group consisting of perfluoroalkoxy monomers, fluorinated, and mixtures thereof.

5. A composition as claimed in claim 1, wherein said latex fluorocarbon elastomer has a fluorine content of from about 50 to about 80 weight percent based on the weight of total fluoroelastomer.

6. A composition as claimed in claim 1, wherein said fluorinated carbon is of the formula CFx, wherein x represents the number of fluorine atoms.

7. A composition as claimed in claim 6, wherein x is a number of from about 0.02 to about 1.5.

8. A composition as claimed in claim 1, wherein said fluorinated carbon has a fluorine content of from about 1 to about 70 weight percent based on the weight of fluorinated carbon, and a carbon content of from about 99 to about 30 weight percent based on the weight of fluorinated carbon.

9. A composition as claimed in claim 1, wherein said fluorinated carbon is selected from the group consisting of a fluorinated carbon having a fluorine content of 62 weight percent, a fluorinated carbon having a fluorine content of 11 weight percent, a fluorinated carbon having a fluorine content of 28 weight percent, and a fluorinated carbon having a fluorine content of 65 weight percent based on the weight of fluorinated carbon.

10. A composition as claimed in claim 1, further comprising an organic solvent in an amount of from about 0 to about 10 percent by weight of the latex.

11. A composition as claimed in claim 1, further comprising an acid acceptor.

12. A composition as claimed in claim 1, further comprising a curative.

* * * * *